US006748473B1

(12) United States Patent
Shatas et al.

(10) Patent No.: US 6,748,473 B1
(45) Date of Patent: Jun. 8, 2004

(54) SPLIT COMPUTER SYSTEM INCLUDING TRANSMISSION OF VIDEO DATA BETWEEN PLURAL ENCLOSURES

(75) Inventors: Remigius G. Shatas, Huntsville, AL (US); Robert R. Asprey, Harvest, AL (US); Christopher L. Thomas, Madison, AL (US); Greg O'Bryant, Madison, AL (US); Greg Luterman, Lenexa, KS (US); Jeffrey E. Choun, Olathe, KS (US)

(73) Assignee: Avocent Huntsville Corporation, Huntsville, AL (US)

( * ) Notice: Subject to any disclaimer, the term of this patent is extended or adjusted under 35 U.S.C. 154(b) by 393 days.

(21) Appl. No.: 09/430,162

(22) Filed: Oct. 29, 1999

Related U.S. Application Data
(60) Provisional application No. 60/106,255, filed on Oct. 30, 1998.

(51) Int. Cl.[7] .............................................. G06F 13/00
(52) U.S. Cl. ...................... 710/300; 710/301; 710/306; 710/305
(58) Field of Search ................................ 710/101–103, 710/62–64, 300, 305, 306, 313–316, 301; 709/217, 218, 250; 370/502

(56) References Cited

U.S. PATENT DOCUMENTS

| | | | |
|---|---|---|---|
| 4,384,327 A | | 5/1983 | Conway et al. |
| 4,959,833 A | | 9/1990 | Mercola et al. |
| 5,764,479 A | * | 6/1998 | Crump et al. ................ 361/685 |
| 5,764,924 A | * | 6/1998 | Hong ......................... 710/101 |
| 5,781,747 A | | 7/1998 | Smith et al. |
| 6,003,105 A | * | 12/1999 | Vicard et al. ............... 710/129 |
| 6,012,101 A | | 1/2000 | Heller et al. |

FOREIGN PATENT DOCUMENTS

| | | |
|---|---|---|
| EP | 0 395 416 | 10/1990 |
| EP | 0 844 567 | 5/1998 |

OTHER PUBLICATIONS

"Digital Semiconductor 21152 PCI–To–PCI Bridge, Data Sheet", Feb. 1996, Digital Equipment Corporation, Maynard, Mass.
"PCI Local Bus Specification, Revision 2.1", Jun. 1995, The PCI Special Interest Group, Portland, Oregon.
Mobility Electronics, Inc. Brochure for PCI Split Bridge, Scottsdale, AZ, ©1999.

* cited by examiner

*Primary Examiner*—Ilwoo Park
(74) *Attorney, Agent, or Firm*—Davidson Berquist Klima & Jackson LLP

(57) ABSTRACT

A split computer (122) comprises a main module (140) remotely connected by external PCI bus (170) to a input/output (I/O) or extension module (142). The main module (140) comprises a processor (181) and an external PCI bus first interface (300). The input/output (I/O) module comprises one or more input and/or output device controllers and an external PCI bus second interface. The external PCI bus connects the external bus first interface of the main module with the external bus second interface of the input/output (I/O) module. The main module executes application programs, maintains user configurations, and maintains application configurations. Yet since the main module is located remotely, e.g., at a data center (150), the both security and centralized management are realized using existing hardware and software. The input/output (I/O) module has a relative small footprint and primarily performs input and output operations.

23 Claims, 6 Drawing Sheets

SPLIT COMPUTER SYSTEM INCLUDING TRANSMISSION OF VIDEO DATA BETWEEN PLURAL ENCLOSURES

CROSS REFERENCE TO RELATED CASES

This application is a continuation of U.S. Provisional Patent Application Serial No. 60/106,255, filed Oct. 30, 1998 entitled "Split Computer." This application also relates to U.S. application Ser. No. 09/430,163 now U.S. Pat. No. 6,418,494, filed contemporaneously.

FIELD OF THE INVENTION

The present invention pertains to computer networks and management thereof.

RELATED ART AND OTHER CONSIDERATIONS

Currently there are essentially three paradigms for computer network architecture. In a first paradigm, illustrated in FIG. 1A, a network 20A has plural client workstations or desktop systems 22A connected to a pool of servers (e.g., data base server 24A, file server 26A, and printer server 28A) and a router 30A. Typically the desktop systems 22A are connected to the servers and router by an appropriate cabling, e.g., a category 5 unshielded twisted pair 32A. Printer server 28A is connected to one or more printers 36A; router 30A is connected through an appropriate gateway or the like to the Internet 38. The servers and routers are traditionally located in a different location from the desktop systems 22A, e.g., in a data center which may be in a different room, in different part of a building, in a differing building, or even in a different geographical area than the client workstations.

The computer network paradigm of FIG. 1A has been characterized as employing "fat client technology". Such characterization indicates that resources are provided at desktop systems 22A to perform the operations of executing application programs, maintaining user configurations, and maintaining application program configurations. The measure of "fatness" is how much of an application program actually executes at the ultimate user's workstation. According to industry analysts, fatness increases the total cost of ownership of the network. In this regard, a significant component of the total cost of ownership is the maintenance required to keep the client workstation running. For example, in order to perform activities such as upgrades and the like, network administrators usually require access to each client workstation. Such access is not necessarily convenient for large networks having desktop systems considerably remote from the administrator's premises.

A second network paradigm is exemplified by network 20B of FIG. 1B. Network 20B includes plural terminals 23B, known as "Windows Terminals", which are connected to a multi-user server 24B. The server 24B is connected via router 30B to the Internet 38, and interfaces with printers 36B. Each of the terminals 23B is connected by cabling 32B to server 24B, with cabling 32B again being (for example) a category 5 unshielded twisted pair 32B. Network 20B is an example of "thin client technology" in that the equipment provided at the desk (e.g., a personal computer) does not perform general purpose functions, but instead acts as a terminal to the server. That is, in network 20B, it is the server that that executes applications, maintains user configurations, and maintains application program configurations. Since the server performs these operations, keystrokes and mouse input received at the terminals are transmitted over the network to the server where, e.g., the application program executes. The execution at the server results in screen displays, etc., which are transmitted back over the network to the terminals.

The "thin client" network 20B of FIG. 1B puts a lean but powerful client computer on the desktop, e.g., a computer with relatively high-end processing power and memory, but with limited peripherals and limited user control of the boot process and operating environment. Since the network administrator has direct access to user configurations, etc., the "thin client technology" typified by network 20B of FIG. 1B makes it easier for the network administrator to upgrade, e.g., application programs, and to change user configurations. Moreover, the "thin client technology" lowers the cost of equipment and the cost of maintenance of resources at the desktop.

A third paradigm, known as the "lean client technology", provides an intermediate compromise between the fat client and thin client technologies. An example of a lean client network 20C is illustrated in FIG. 1C as including network personal computers (NetPCs) 22C connected to a pool of application/user configuration servers 24C and router 30C over cabling 32C (e.g., a category 5 unshielded twisted pair 32C). In lean client network 20C, the personal computers (NetPCs) 22C execute the applications programs, but the application/user configuration servers 24C are employed to maintain user configurations and application configurations. The applications programs are maintained at the application/user configuration servers 24C and downloaded as needed to the personal computers (NetPCs) 22C for execution at the personal computers (NetPCs) 22C.

Concerning computers per se, the PCI expansion bus is a current means for adding hardware to a present day personal computer (PC). The PCI expansion bus is typically realized by expansion slots, which are usually mounted on the motherboard of the computer. Current designs use the PCI-bridge technology to support multiple three-slot PCI buses on a system.

It has been known in the prior art to divide a computer into two components, but such division has heretofore occurred at a video card. Nor has the video card-based computer division addressed the networking concerns such as total cost ownership, for example.

Whereas the thin and lean technologies depend upon new applications that run on servers or get downloaded, and it can be difficult to change to these type of applications. What is needed therefore, and an object of the present invention, is a computer which affords centralized management using as much existing software and hardware as possible.

BRIEF SUMMARY OF THE INVENTION

A split computer comprises a main module remotely connected by external PCI bus to a input/output (I/O) or extension module. The main module comprises a processor and an external PCI bus first interface. The input/output (I/O) module comprises one or more input and/or output device controllers and an external PCI bus second interface. The external PCI bus connects the external bus first interface of the main module with the external bus second interface of the input/output (I/O) module. The main module executes application programs, maintains user configurations, and maintains application configurations. Yet since the main module is located remotely, e.g., at a data center, the both security and centralized management are realized using existing hardware and software. The input/output (I/O)

module has a relative small footprint and primarily performs input and output operations.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
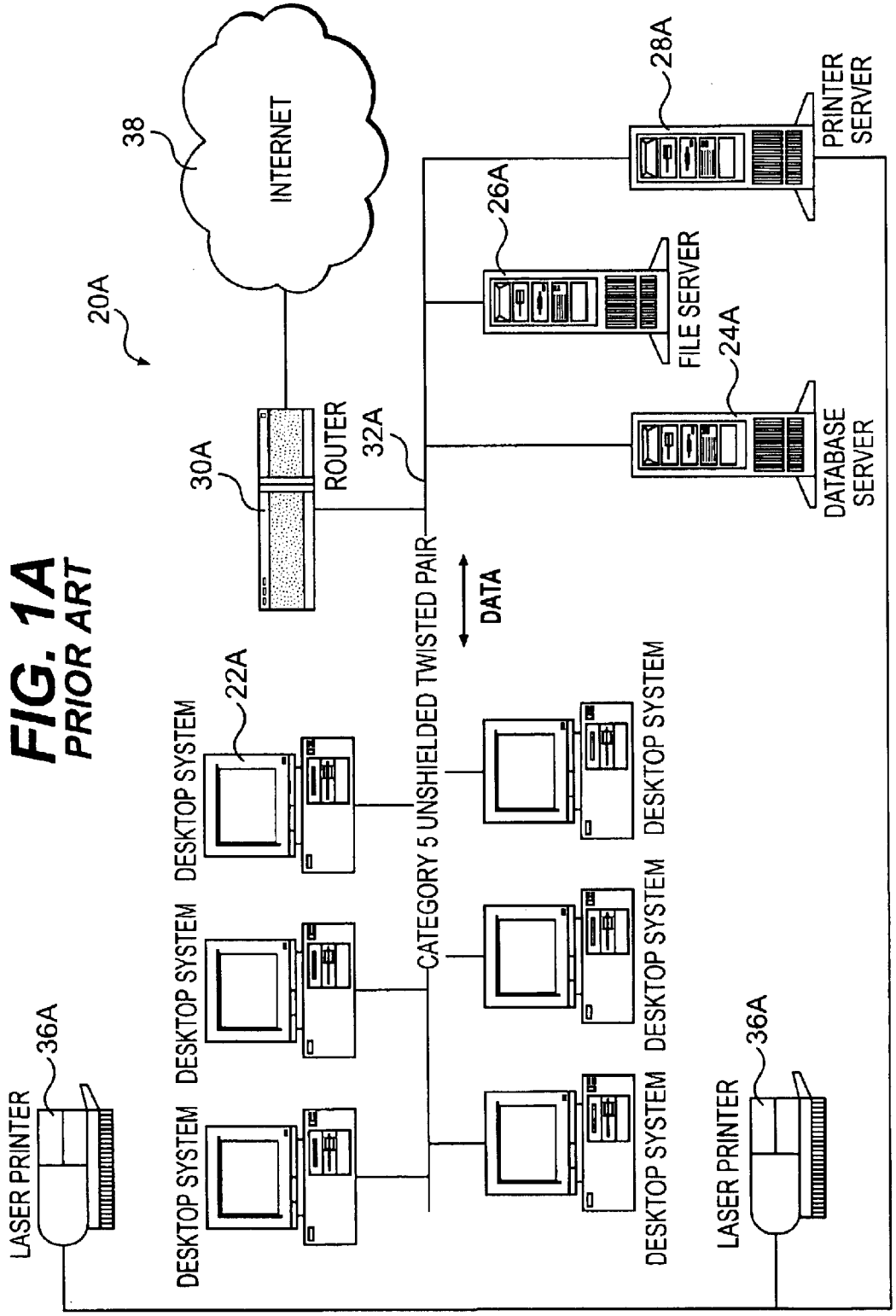
FIG. 1A is a schematic view of a prior art fat client computer network.
Figure 1B:
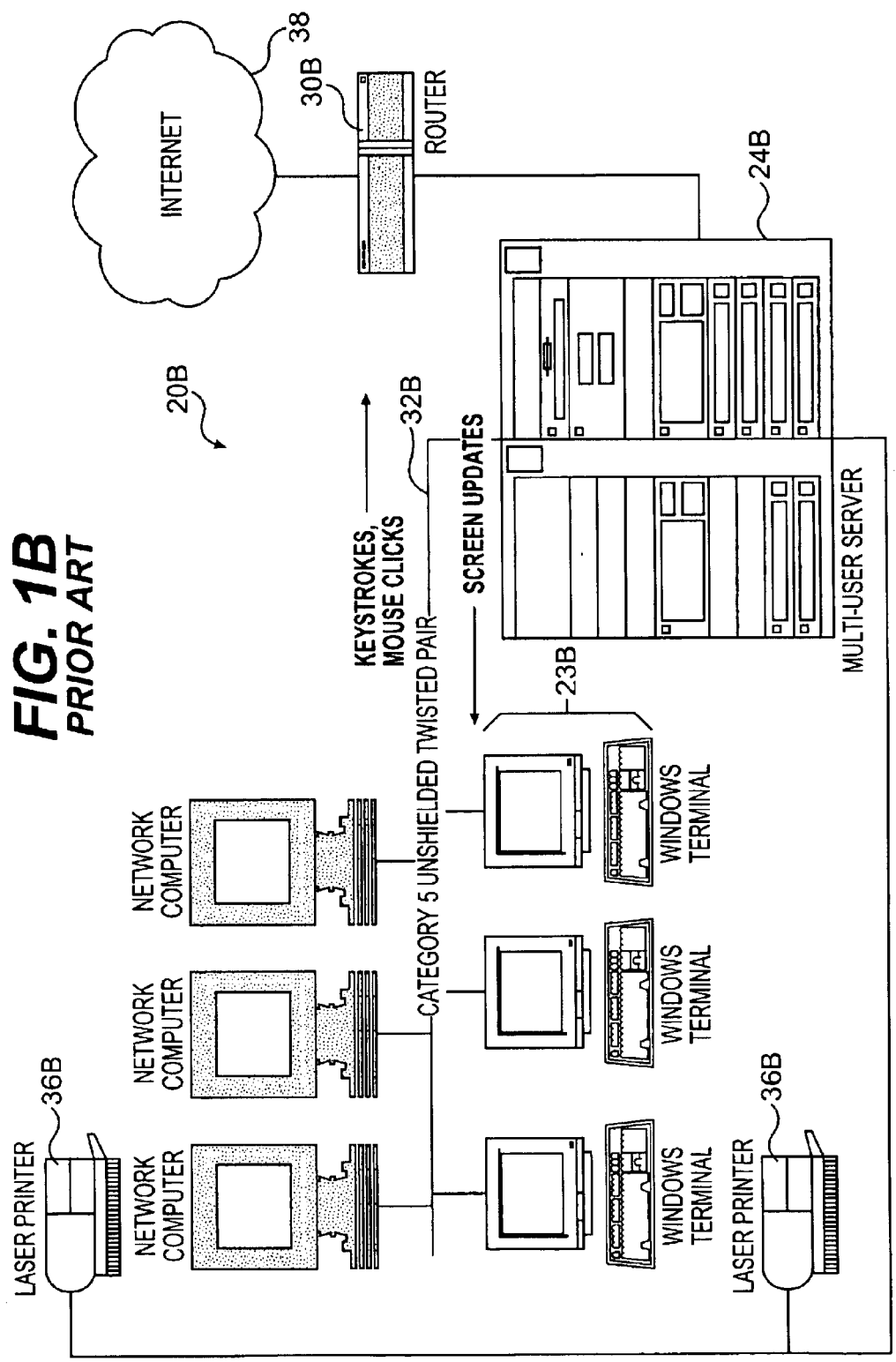
FIG. 1B is a schematic view of a prior art thin client computer network.
Figure 1C:
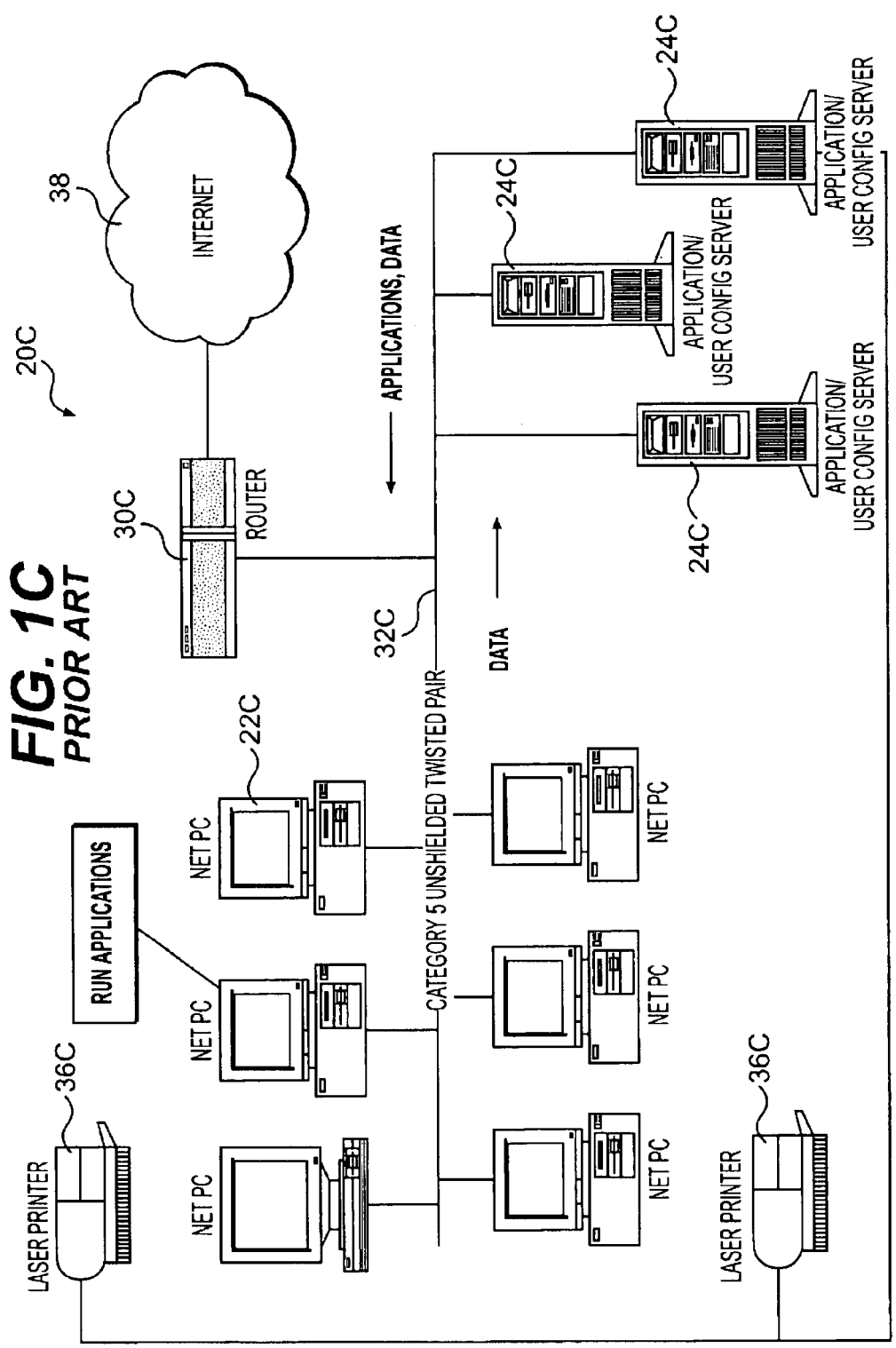
FIG. 1C is a schematic view of a prior art lean client computer network.
Figure 2:
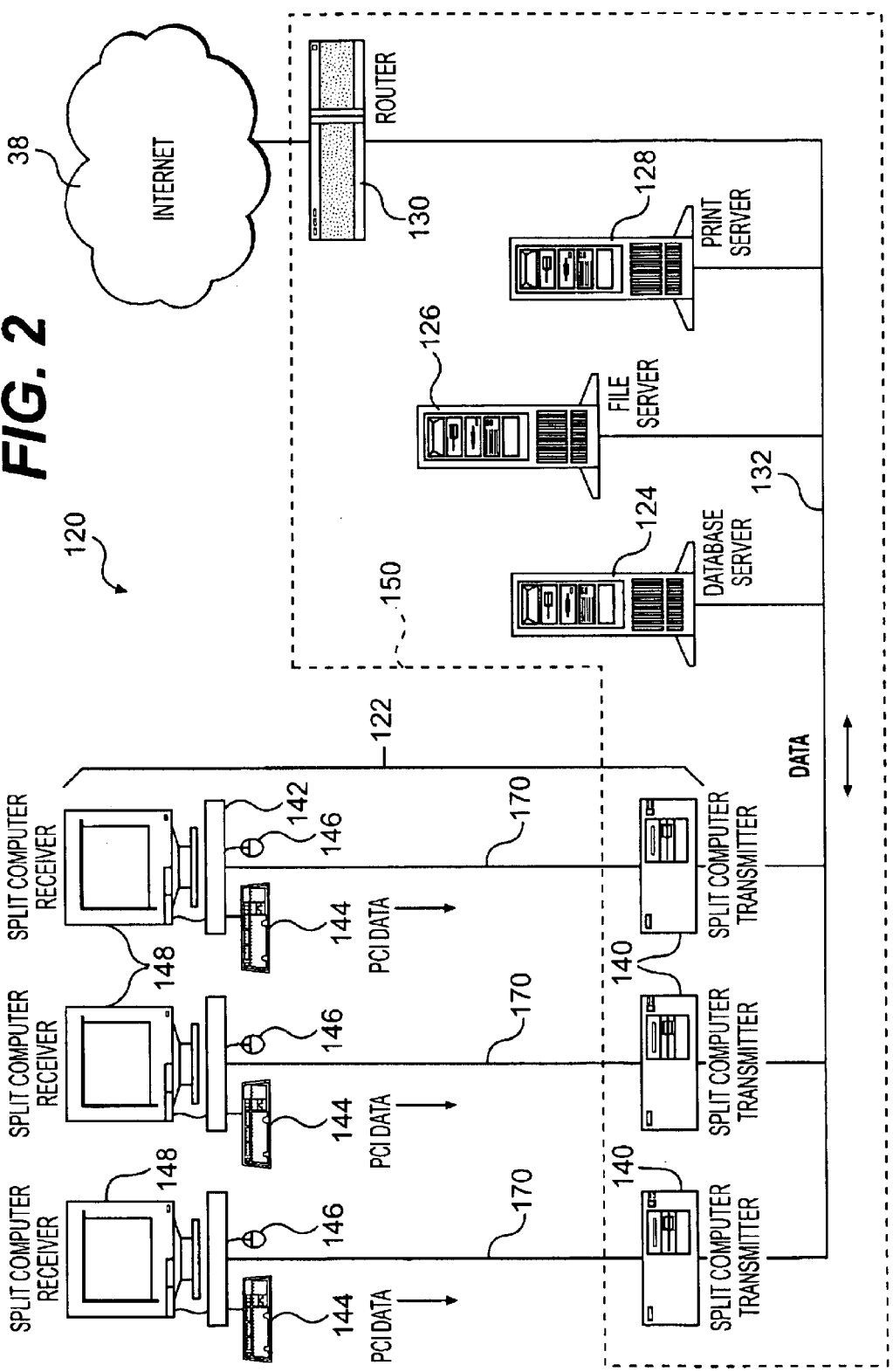
FIG. 2 is a schematic view of a computer network according to an embodiment of the present invention which employs a "split computer".

An entirely new paradigm of computer is illustrated by the computer network 120 of FIG. 2. The new paradigm is that of a "split computer" in which functions of a single client computer are distributed into two sides or two modules, with one of the sides or modules being remote from the other. FIG. 2 illustrates three such split computers 122. Each split computer 122 comprises a main module 140 or first side, and an input/output (I/O) module 142 or second side. The input/output (I/O) module 142 is situated at the user, and is connected to input/output devices such as a keyboard 144, cursor control device (e.g., mouse) 146, and display screen (e.g., monitor) 148. The main module 140 is situated remotely from the user, and is preferably located in a data center (framed in FIG. 2 by broken line 150)

The data center 150 of FIG. 2 thus includes not only a pool of servers (e.g., data base server 124, file server 126, and printer server 128) and a router 130 (for connection to internet 39), but main modules 140 for each of the split computers 122 comprising computer network 120. The main modules 140 of split computers 122 are connected over network cabling 132 (e.g., a category 5 unshielded twisted pair) to the pool of servers and to router 130. Thus, essentially all of the connections to the network cabling 132 occur or reside in data center 150.

In at least one embodiment, main module 140 and input/output (I/O) module 142 are housed in (separate) enclosures, for which embodiment the enclosure or cabinet housing main module 140 is known as the first or main enclosure 160, while the enclosure or cabinet housing input/output (I/O) module 142 is known as the second enclosure 162. Structure housed in first or main enclosure 160 and second enclosure 162 is discussed subsequently in more detail in connection with FIG. 3. Additionally, in terms of nomenclature, main module 140 is sometimes referred to as the split computer host, while input/output (I1O) module is sometimes referred to as the split computer terminal or the expansion module.

Figure 3:
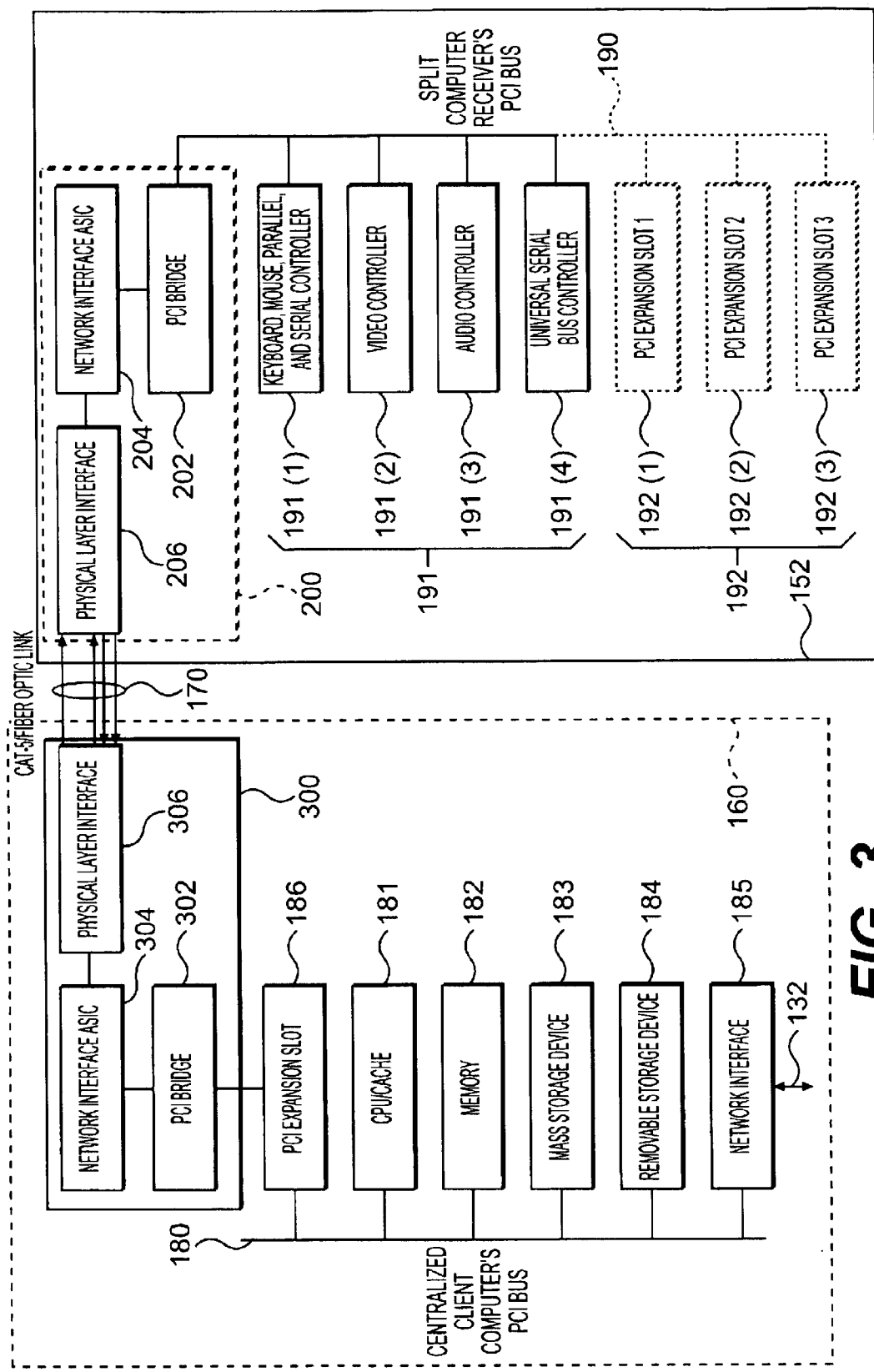
FIG. 3 is a schematic view of a "split computer" according to an embodiment of the invention.

As shown in FIG. 2 and in more detail in FIG. 3, the main module 140 and the input/output (I/O) module 142 of each split computer 122, while being remotely located from one another, are connected by an external bus 170. In the illustrated embodiment external bus 170 is a PCI data bus realized by a Cat-5 fiber optic link, but can take other forms such as a Cat-5 unshielded twisted pair, for example.

Example constituent elements of main module 140 and input/output (I/O) module 142 are shown in FIG. 3. The main module 140, shown as having its elements housed in first or main enclosure 160, includes an internal bus 180 which is also known as the client computer bus. In the illustrated embodiment, internal bus 180 is a PCI bus, and has connected thereto each of a processor (CPU) 181, a network interface 185, and an expansion slot 186. The memory 182 can include both RAM and ROM memory and hangs off of the CPU 181. A mass storage device 183 and a removable storage device 184 connect to the PCI bus 180. The mass storage device 183 can be (for example) a hard drive and the removable storage device 184 can be a floppy disk drive or drive for some other removable storage media. The network interface 185 serves to connect the main module 140 of split computer 122 to network cabling 132 (see FIG. 2).

The input/output (I/O) module 142, shown as having its elements housed in second enclosure 152, includes an internal bus 190 which is also known as the terminal bus. In the illustrated embodiment, internal bus 190 is a PCI bus, and has connected thereto various controllers 191, expansion slots 192, and an external bus interface (framed in FIG. 3 by broken line 200). Among the controllers 191 are: a video controller 191(2); an audio controller 191(3); and a universal serial bus controller 191(4). The keyboard, mouse, parallel, and serial controller 191(1) works in conjunction with keyboard 144 and mouse 146 (see FIG. 2). The controller 191(1) connects through the sideband signals of the physical interface. The controllers 191(2) and 191(3) work in conjunction with monitor 148. A representative number of three PCI expansion slots 192(1)–192(3) are illustrated as being connected to internal bus 190. The input/output (I/O) module 142 can thus be connected directly to various input/output devices other than those shown, such as printers, digitizers, and scanners.

The external bus interface 200 of input/output (I/O) module 142 includes a PCI bridge 202 which is connected to internal bus 190, a network interface ASIC 204 which is connected to PCI bridge 202, and a physical layer interface 206 (comprising host and terminal) which connects network interface ASIC 204 to external network interface 170.

Returning to main module 140, the expansion slot 186 has inserted therein an external bus interface card, which is also known as external bus interface 300 or the PCI bus extender card. In essentially mirror image fashion with external bus interface 200 of input/output (I/O) module 142, the external bus interface 300 of main module 140 includes a PCI bridge 302 which is connected via expansion slot 186 to internal bus 180, a network interface ASIC 304 which is connected to PCI bridge 302, and a physical layer interface 306 which connects network interface ASIC 304 to external network interface 170.

In the split computers 122 of computer network 120 of FIG. 2, the main modules 140—located in first or main enclosure 160—run application programs, maintain user configurations, and maintain application configurations. The external bus interface 300, through which main module 140 communicates with external bus interface 200 of input/output (I/O) module 142, allows the operating system of the split computer 122 to communicate with a number of PCI buses and devices for performance of remotely occurring input/output operations.

Using Cat-5 unshielded twisted pair as external network interface 170 enables the main module 140 and input/output (I/O) module 142 to be separated by as much as one hundred meters. Other implementations of external network interface 170, such as fiber optics, permits greater distances, on the order of one or two kilometers, for example.

Figure 4:
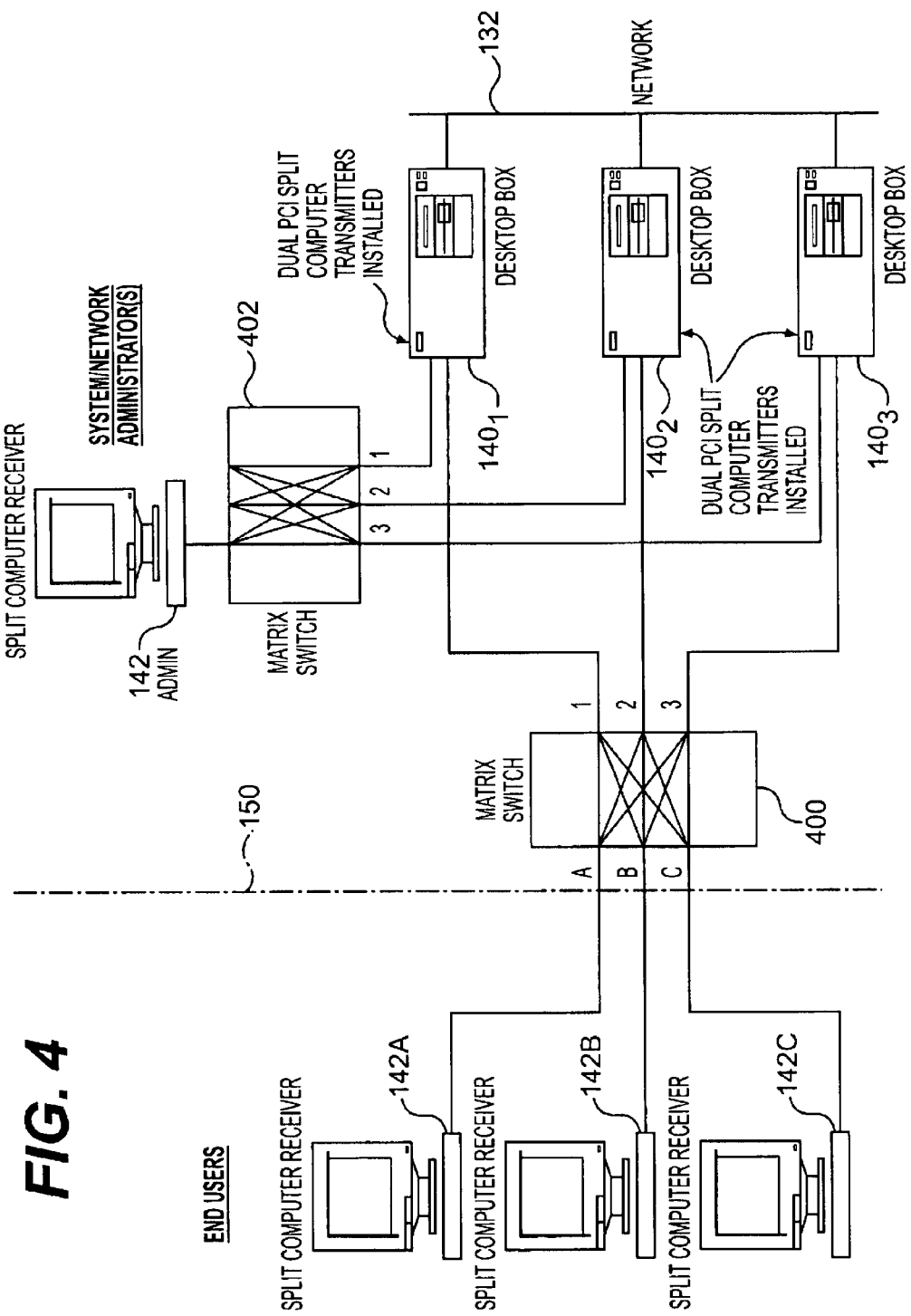
FIG. 4 is a schematic view of a computer network according to an embodiment of the present invention which employs a "split computer" and matrix switches.

FIG. 4 shows use of plural split computers 122 of the present invention in conjunction with one or more matrix switches, particularly matrix switch 400 and matrix switch 402. In particular, FIG. 4 shows that plural main modules 140$_1$, 140$_2$, and 140$_3$ reside in data center 150. The data center 150 also has matrix switch 400 having a first port connected to main module 140$_1$, a second port connected to main module 140$_2$, and a third port connected to main module 140$_3$. Ports A, B, and C of matrix switch 400 are connected to input/output (I/O) modules 142$_A$, 142$_B$, and 142$_C$, respectively. The input/output (I/O) modules 142$_A$, 142$_B$, and 142$_C$ are remotely located from data center 150, e.g., at desktops of respective users. By control of matrix switch 400, any one of the main modules 140$_1$, 140$_2$, and 140$_3$ can be connected to any one of the input/output (I/O) modules 142$_A$, 142$_B$, and 142$_C$, as shown by the alternate internal paths illustrated in matrix switch 400.

In addition, if the main modules 140 are each provided with two external bus interfaces 300, the main module 140 can also be connected to an administrator's input/output (I/O) module 142$_{ADMIN}$ as shown in FIG. 4. Connection to administrator's input/output (I/O) module 142$_{ADMIN}$ permits the administrator to perform various operations at the main modules 140 and to view activities occurring at the main modules 140. Yet further, connection of each of main modules 140$_1$, 140$_2$, and 140$_3$ to administrator's input/output (I/O) module 142$_{ADMIN}$ through a second matrix switch 402 allows the administrator, by operation of matrix switch 402, to selectively monitor any one of the main modules 140$_1$, 140$_2$, and 140$_3$.

The split computer 122 of the present invention provides both the security and centralized management (e.g., at data center 150), and also provides the power and resources of a fully equipped "fat" client computer at main module 140. Only digital PCI transaction data has to traverse external network interface 170. In essence, the PCI bus 180 of main module 140 has been extended from data center 150 to the user's desk top or work area. The split computer 122 thus provides a cost-effective way to remotely locate PCI peripherals, allowing the main module 140 to access the entire 32 bit PCI memory and PCI I/O address space of any add-in cards installed in the PCI slots of input/output (I/O) module 142.

The split computer 122 of the present invention offers numerous advantages. For example, the split computer 122 reduces total cost of ownership, and facilitates easier maintenance of client machines. Having the main modules 140 of all split computers 122 of computer network 120 in a centralized location (e.g., data center 150) facilitates more efficient management of software licenses, virus protection, protection of sensitive data. Moreover, the present invention allows easier upgrades of both user hardware and software.

Advantageously, the input/output (I/O) module 142 is a low cost device which has a relative small footprint. A compact input/output (I/O) module 142 is particularly useful in economizing space when used with a flat panel display for a monitor.

Unlike other paradigms which require radical changes to current computer hardware and software, the split computer 122 of the present invention maintains the current network computing hardware, software, and cabling, while decreasing the total cost of ownership.

By installing an external bus interface 300 in a centralized main module 140 (e.g., located in data center 150), connecting a first end of a network link (e.g., external network interface 170) to the external bus interface 300, and placing a input/output (I/O) module 142 (connected to a second end of the external network interface 170) on the user's desk, the split computer 122 is essentially realized. Users can access their applications, files, servers, printers, and the Internet as if their computers were still on their desktops. In reality, however, the computers (in the form of main module 140) are remotely located at data center 150, thereby permitting ready access by the network administrator.

It will be appreciated that the main modules 140 for many split computers 122 can be mounted in network racks or otherwise organized in modular workcenters. All of the main modules 140 are connected (via their network interfaces 185) to any network hubs, routers, or phone lines.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A split computer comprising:
   a first enclosure;
   a second enclosure;
   a processor and an external network first interface communicating together and housed within the first enclosure;
   an input and/or output device controller, a video controller, and an external network second interface communicating together and housed within the second enclosure;
   an external network which connects the external network first interface in the first enclosure and the external network second interface in the second enclosure; and
   wherein the external network first interface transmits standard bus data including video data.

2. The apparatus of claim 1, wherein the external network is a PCI bus.

3. The apparatus of claim 2, wherein the at least one of the external network first interface and the external network second interface comprises a PCI bridge, a physical layer interface, and a network interface.

4. The apparatus of claim 2, further comprising a PCI expansion slot which is connected by an internal bus of the first enclosure to the processor of the first enclosure, and wherein the external network first interface is an extender card which inserts into a PCI expansion slot.

5. The apparatus of claim 2, wherein the external network is a Cat-5 link.

6. The apparatus of claim 1, wherein the input and/or output device controller is for one of a video output device, an audio output device, a keyboard, a mouse, and a universal serial bus.

7. The apparatus of claim 1, further comprising a network interface housed in the first enclosure and connected by an internal bus of the first enclosure to the processor of the first enclosure.

8. The apparatus of claim 1, further comprising a storage device housed in the first enclosure and communicates with the processor of the first enclosure.

9. The apparatus of claim 8, wherein the storage device is one of a mass storage device and a removable storage device.

10. The apparatus of claim 1, wherein the processor and the external network first interface are housed within the first enclosure and are connected by an internal bus of the first enclosure.

11. A split computer according to claim 1, wherein the first enclosure and the second enclosure are separated by at least 50 meters.

12. A split computer comprising:
 a split computer first side comprising:
 a processor;
 an external network first interface communicating with the processor;
 a split computer second side comprising:
 an I/O device controller;
 a video controller;
 an external network second interface connected to the I/O device controller;
 an external network which connects the external network first interface and the external network second interface to operatively couple both the I/O device controller and the video controller to the processor; and
 wherein the external network first interface transmits standard bus data including video data.

13. The apparatus of claim 12, wherein the external network is a PCI bus.

14. The apparatus of claim 13, wherein the at least one of the external network first interface and the external network second interface comprises a PCI bridge, a physical layer interface, and a network interface.

15. The apparatus of claim 13, further comprising a PCI expansion slot which is connected by a first side internal bus to the processor of the first side, and wherein the external network first interface is an extender card which inserts into the PCI expansion slot.

16. The apparatus of claim 13, wherein the external network is a Cat-5 link.

17. The apparatus of claim 12, wherein the I/O device controller is for one of a video output device, an audio output device, a keyboard, a mouse, and a universal serial bus.

18. The apparatus of claim 12, further comprising a network interface connected by a first side internal bus to the processor.

19. The apparatus of claim 12, further comprising a storage device communicating with the processor.

20. The apparatus of claim 19 wherein the storage device is one of a mass storage device and a removable storage device.

21. The apparatus of claim 12, wherein a first side internal bus connects the processor and the external network first interface, and wherein a second side internal bus connects the input and/or output device controller and the external network second interface.

22. A split computer, comprising:
 first and second computer parts respectively in separated first and second housings, communicating together via an external network;
 the first housing containing a computer processor, a storage device, and a first network interface coupled to the external network, all communicating on a common first internal bus within the first housing;
 the second housing containing an user I/O controller, a video controller, and a second network interface coupled to the external network, all communicating on a common second internal bus within the second housing; and
 wherein the external network first interface transmits standard bus data including video data.

23. A split computer according to claim 22, wherein: the second housing further includes an audio controller communicating via the second internal bus.

* * * * *